Jan. 2, 1968     E. R. GUTHRIE     3,361,906
ELECTRICAL SWITCH FOR MODEL RAILROAD TRACK SWITCH
Filed July 13, 1964
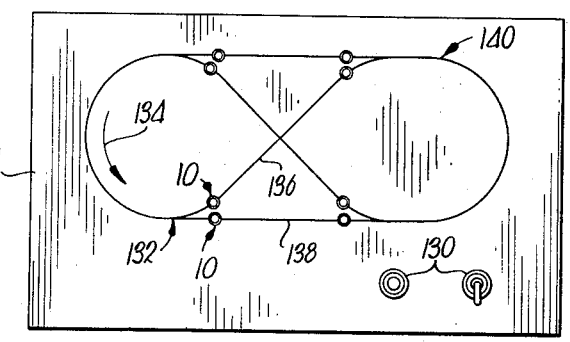
*Fig.1.*
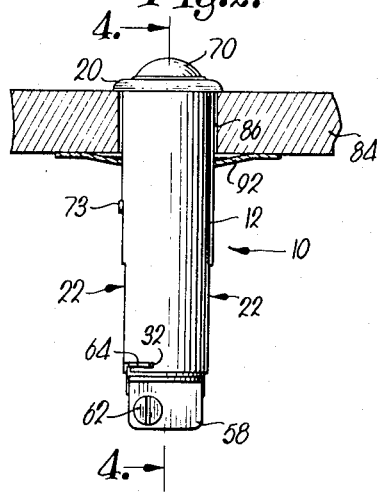
*Fig.2.*
*Fig.3.*
*Fig.4.*
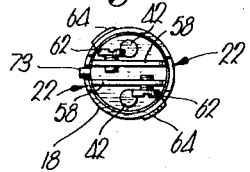
*Fig.5.*
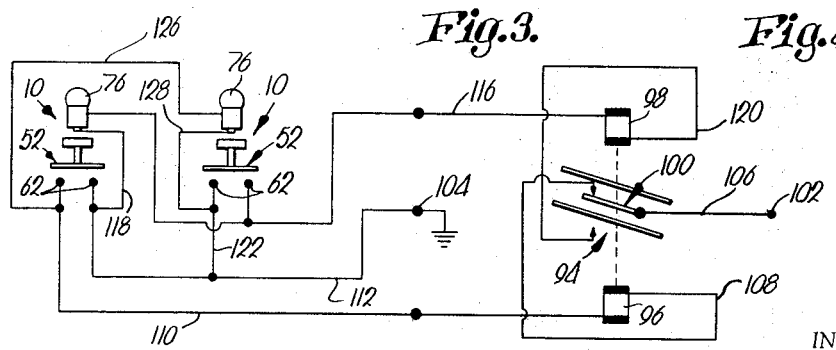
*Fig.6.*
INVENTOR.
Eldred R. Guthrie
BY
Hovey, Schmidt, Johnson & Hovey,
ATTORNEYS.

3,361,906
ELECTRICAL SWITCH FOR MODEL RAILROAD
TRACK SWITCH
Eldred R. Guthrie, 7340 Virginia Ave.,
Kansas City, Mo. 64131
Filed July 13, 1964, Ser. No. 382,315
6 Claims. (Cl. 246—220)

This invention relates to model railroad apparatus and, more particularly, to an electrical switch of improved construction for use in actuating a track switch of a model railroad system.

Solenoid-actuated track switches are provided as part of model railroad track equipment for the usual purpose of changing the operative condition of the track of a model railroad system. These switches are generally of the type which are alternately movable between a pair of operative positions upon actuation of a pair of solenoids coupled therewith, the solenoids being in turn energized by an electrical switch adjacent to the track switch itself. A light source also coupled with the track switch adjacent thereto indicates to the operator of the system the operative condition of the track switch. It is evident, therefore, that if the system covers a relatively large area and utilizes a number of objects which obscure portions of the track, it is sometimes difficult for the operator to view the conditions of the entire track from the location at which the train or trains of the system are controlled.

The present invention provides means whereby the operator of a model railroad system may remotely control the operative condition of the railroad track of the system wherein a number of track switches of the type described are utilized. As a result, the system is more efficiently operated than has heretofore been possible with the aforesaid conventional equipment. Moreover, the present invention permits the operator to observe the operative condition of the entire track of the system without having to observe the operative positions of individual track switches located at the various spaced locations along the track. In this respect, the instant invention is used with a control board which simulates the actual track layout of the system and which mounts a number of electrical switches made pursuant to the concepts of the present invention for changing the operative positions of various track switches from a central location accessible to the operator of the system.

It is, therefore, the primary object of the present invention to provide an electrical switch of improved construction having visual indicating means thereon and capable of being mounted on a control board of the type described whereby the electrical switch may be adaptable for use in actuating a track switch of a model railroad system from a location remote from the track switch, and the operative condition of the track switch may be observed by means of the visual indicating means to thereby preclude the viewing of the track switch itself or a visual indicator adjacent thereto.

Another object of the present invention is the provision of an electrical switch of the aforesaid character which has an observable light source therewithin which is energized when the switch is actuated so that, when the electrical switch is mounted in a proper position on the control board, both the operative condition of the respective track switch and the path over which a train of the system moves, will be immediately made known by observing the energized light source following the actuation of the electrical switch.

A further object of this invention is the provision of an electrical switch of the push-button type which may be conveniently mounted on a control board, but which may be easily separated therefrom for maintenance purposes as required.

Yet another object of the present invention is the provision of an electrical switch which can be mounted on a control board with only the actuating portion thereof accessible, while the remainder of the switch is concealed by the control board so that a pair of switches can be energized when the switch is actuated so that, when the while at the same time be coupled with the pair of solenoids of a model railroad track switch so as to alternately actuate the latter upon manipulation of the actuating portions of the electrical switches.

In the drawings:

FIGURE 1 is a side elevational view of a control board simulating the track layout of a model railroad system and illustrating the various mounting locations of a number of electrical switches made pursuant to the concepts of the present invention;

FIG. 2 is an enlarged, side elevational view of the electrical switch and showing the way in which it is mounted on the control board;

FIG. 3 is a view similar to FIG. 2 but illustrating another portion of the electrical switch, parts being broken away to illustrate details of construction;

FIG. 4 is a cross-sectional view taken along line 4—4 of FIG. 2;

FIG. 5 is an end elevational view of the electrical switch showing the terminals for coupling the latter with a solenoid of a model railroad track switch; and FIG. 6 is a schematic wiring diagram of an electrical circuit employing a pair of the electrical switches for actuating a 2-position model railroad track switch.

The electrical switch of the present invention is adapted for use on a control board simulating the track layout of a model railroad system and includes a tubular housing adapted to be ridigidly secured to the control board. A pushbutton switch disposed in the housing adjacent to one end thereof is adapted to be electrically coupled to a source of electrical power and to one of a pair of solenoids forming parts of a model railroad track switch. An actuator in the nature of a tube is received within the housing and has a transparent closure thereon adjacent to and accessible at the opposite end of the housing for actuating the push-button switch when the closure is manually forced in a direction toward the interior of the housing. A light source within the tube is adapted to be energized when the push-button switch is actuated, the light from the light source being observable through the transparent closure so as to indicate remotely the operative condition of the corresponding track switch.

Electrical switch 10, made pursuant to the concepts of the present invention, includes a tubular housing 12 having a pair of opposed, open ends 14 and 16 and a cylindrical side wall 18 between ends 14 and 16. A transversely arcuate, continuous flange 20 is integral with side wall 18 at end 14, and side wall 18 is provided with a pair of elongated slots 22 extending longitudinally thereof from end 16 as shown in FIG. 3 and disposed at diametrically opposed locations as shown in FIG. 2. Each slot 22 defines a pair of first, substantially parallel edges 24 and 26 and pair of second edges 28 and 30. Edges 24 and 26 are spaced apart a distance greater than the distance between edges 28 and 30, as shown in FIG. 3.

Each edge 26 is provided with a transverse slot 32 which extends circumferentially about a portion of side wall 18 in relatively close proximity to end 16. A base 34 of circular configuration is disposed within housing 12 at end 16 thereof. Base 34 includes a pair of electrically insulating sections 36 and 38 having a rigid, disc-like member 40 therebetween and interconnected by a pair of rivets 42. Member 40 is provided with openings 44 which permit rivets 42 to pass therethrough, openings 44 being of sufficient size to space rivets 42 from member 40.

A disc 46 having a continuous side flange 48 is connected by a coil spring 50 to the proximal face of section 38. Disc 46 and flange 48 are of an electrically insulating material, disc 46 defining a support for a contact element 52 of electrically conductive material. Element 52 is provided with a pair of legs 54 which pass through a space 56 defined by central, aligned openings in sections 36 and 38 and member 40 as shown in FIG. 4. Legs 54 are disposed for electrically contacting L-shaped terminal plates 58 spaced apart and rigidly coupled to sections 36 and 38 by rivets 42. An insulating spacer 60 maintains plates 58 in spaced-apart relationship. Screws 62 are threadably coupled to respective plates 58 and provide electrical terminals for the switch defined by element 52 and plates 58.

Disc 46 is disposed within side wall 18 with flange 48 extending longitudinally of housing 18 and providing guide means for disc 46 as the latter moves toward and away from end 16 when force is applied thereto and then removed therefrom. To maintain base 34 within housing 12 as force is applied to disc 46, member 40 is provided with a pair of laterally extending projections 64 shown in FIGS. 3 and 5. Each projection 64 has a width less than the distance between edges 24 and 26 so that, when projections 64 are within slot 22 and circumferentially aligned with respective slots 32, rotation of base 34 is sufficient to move projections 64 into slots 32 as shown in FIG. 3. Thus, base 34 is releasably coupled to housing 12. For removing base 34 from housing 12, base 34 is rotated in the opposite direction to move projections 64 out of slots 32 and thereafter, base 34 is shifted longitudinally of housing 12 in a direction away therefrom.

A tube 66 of electrically insulating material normally engages the innermost face 68 of disc 46 and terminates adjacent to end 14 of housing 12. A rigid, transparent closure member 70 is provided with a sleeve 72 which telescopes into tube 66 at the extremity thereof adjacent to end 14. Closure 70 projects outwardly of end 14 so as provide an accessible boss for manually forcing tube 66 toward end 16, and thereby to compress spring 50 to in turn electrically interconnect plates 58.

A projection 73 is rigid to tube 66 and extends laterally therefrom. Projection 73 normally is disposed within slot 22 between edges 28 and 30 to prevent rotation of tube 66 with respect to housing 12. Projection 73 is receivable within either of the slots 22.

A light source 74 is disposed within tube 66 and includes an incandescent bulb 76 mounted in a threaded socket 78. A pair of wires 80, only one of which is shown in FIG. 4, is coupled with socket 78 and adapted to be operably coupled to a source of electrical power for actuating bulb 76. Tube 66 is provided with a pair of spaced recesses 82 at the extremity thereof adjacent to disc 46 for permitting wires 80 to extend outwardly from housing 12. Recesses 82 are preferably at diametrically opposed locations with respect to each other so that wires 80 may pass through slots 22 when recesses 82 are aligned therewith.

Switch 10 is adapted to be mounted on a control board 84 simulating the track layout of a model railroad system. In this respect, board 84 is provided with an opening 86 extending between the front and rear faces 88 and 90 respectively. Housing 12 extends through opening 86, and flange 20 engages face 88 when switch 10 is mounted for operation on board 84. A fastener 92 of any suitable type may be utilized for securing housing 12 in place. Only the actuating portion of switch 10 is accessible from the front of board 84, while the remainder of switch 10 is concealed thereby.

In use, a pair of switches 10 are operably coupled to a respective track switch of a model railroad system. As shown in FIG. 6, a track switch of this type is denoted by the numeral 94 and includes a pair of actuating solenoids 96 and 98, and a 2-position electrical switch 100 which is actuated upon physical movement of track switch 94. When the switch center corresponding to solenoid 96 is actuated, i.e., element 52 thereof being moved to electrically interconnect terminals 62, electrical current flows from a source of electric power coupled with a pair of contacts 102 and 104 (FIG. 6) by means of the following circuit: Contact 102, lead 106, lead 108, solenoid 96, lead 110, terminals 62, lead 112 and contact 104. Actuation of solenoid 96 will shift track switch 94 into its alternate operative position while at the same time, switch 100 will be shifted into another operative condition. Bulb 76, corresponding to solenoid 96, will be energized through the following circuit: Contact 102, lead 106, switch 100, lead 120, solenoid 98, lead 116, bulb 76, lead 118, lead 112 and contact 104. Thus, bulb 76 will be energized and the light therefrom will be viewable through the corresponding closure 70 to indicate the operative position of track switch 94.

The other switch 10 is actuated to shift track switch 94 in the opposite direction by actuating solenoid 98. This action occurs by directing electrical current through the following circuit: Contact 102, lead 106, lead 120, solenoid 98, lead 116, terminals 62 (electrically interconnected by the corresponding element 52), lead 122, lead 112, and contact 104.

The corresponding bulb 76 will be energized by means of the following circuit: Contact 102, lead 106, switch 100, lead 108, solenoid 96, lead 110, lead 126, bulb 76, lead 128, lead 122, lead 112, and contact 104.

Track switch 94 is alternately moved into its two operative positions by successively actuating the pair of switches 10 coupled therewith. In each case, the corresponding light source 74 will be operated so that the operator of the track switch may immediately determine the operative position of the track switch 94.

When used with control board 84 having lines simulating the actual track layout of a model railroad system and manual control 130 for operating the train or trains on the system, a pair of switches 10 is utilized at each junction between a pair of convergent track section. As shown in FIG. 1, four junctions are simulated by lines drawn on face 88 of board 84 and adjacent each junction a pair of switches 10 is mounted on board 84 in the manner shown in FIG. 2. Each pair of switches 10 is mounted on board 84 in alignment with respective lines which approach the junction simulating the junction controlled by the track switch to which the pair of electrical switches is connected. Thus, the pair of switches 10 at junction 132 on board 84 will control the track switch 94 at the corresponding junction on the actual system itself and, if a train is moving in the direction of arrow 134 and approaching junction 132, the train will either move along the track of the system simulated by line 136, or along the track simulated by the line 138, depending upon which of the two switches 10 is actuated. If switch 10 corresponding to line 136, is actuated, this condition will be noted by viewing the light from source 74 thereof. The train will then move over the track corresponding to line 136 to a junction 140 remote from junction 132. Conversely, if the other switch 10 is actuated, the train will move along the portion of the track simulated by line 138 and approach junction 140 in the opposite direction.

Therefore, not only can the operative condition of a track switch be immediately changed, but the route or path over which a train moves may be determined by use of a control board similar to that as shown in FIG. 1 inasmuch as the light sources 74 of the various switches 10 may be energized to denote the actual path of travel of the train of the system. Since board 84 may be conveniently located at a central point with respect to the model railroad layout, it is clear that the track conditions of the entire system may be controlled from a single point and be immediately observed upon viewing the various switches 10 on board 84.

By releasably coupling base 34 to housing 12, access may be had to the interior of housing 12 for maintenance purposes. For instance, if a bulb 76 is to be replaced, little time and effort need be expended to accomplish this inasmuch as base 34 is readily separated from end 16 of housing 12. It is clear that closure members 70 may be of different colors so that the color of the light from one of the switches 10 at a specific junction will be different from the color of the light from the other switch.

Having thus described the invention, what is claimed as new and desired to be secured by Letters Patent is:

1. An electrical switching unit comprising:
   a tubular housing having a pair of open ends;
   a base having a pair of spaced electrical terminals and an electrically conductive contact element movable from a first position out of bridging relationship to said terminals to a second position in bridging relationship thereto, said terminals being adapted to be coupled to a source of electrical power and to an electrical operable device for electrically actuating the latter when said element is in said second position;
   means releasably mounting said base on said housing with said element at one end thereof there being a pair of slots in said housing, one of said slots extending longitudinally of the housing from said one end and the other slot extending transversely of the housing from said one slot in spaced relationship to said one end, said mounting means including a projection secured to and extending laterally from the base, said base being movable into said one end of the housing to move said projection into said one slot until the projection is aligned with said other slot, said base being rotatable relative to said housing to move said projection into said other slot when said projection is aligned therewith to thereby releasably secure said base to said housing;
   an actuator shiftably mounted within and extending longitudinally of said housing and terminating adjacent the opposite end threeof, said actuator being coupled with said element and disposed for moving the same to said second position when said actuator is moved toward said one end of the housing; and
   an electrically actuated light source within said housing and adapted to be coupled to a source of electrical power, whereby light from said source may be viewed through said open opposite end of the housing.

2. In model railroad track apparatus having a two-position track switch provided with a pair of electrically energized actuating solenoids and a two-position electrical switch, having a pole adapted to be joined to a source of electrical energy and a pair of alternately energizable contacts the combination with said track switch of electrical means for alternately energizing said solenoids to alternately move said track switch and the electrical switch pole into the two positions thereof and for providing continual visual indication of the last solenoid energized, said means comprising a pair of electrical switching units, there being a unit for each solenoid respectively, each of said units including:
   a tubular housing having a pair of open ends;
   a base having a pair of spaced electrical terminals and an electrically conductive element movable from a first position out of bridging relationship to said terminals to a second position in bridging relationship thereto, the respective corresponding solenoid being coupled between one terminal and the corresponding contact, the other terminal adapted to be operably coupled to said source of electrical power whereby the solenoid is energized when said element is in said second position and said electrical switch is in the position thereof connecting said corresponding contact with the source of electrical energy;
   means mounting said base on said housing with said element at one end thereof;
   an actuator shiftably mounted within and extending longitudinally of said housing and terminating adjacent to the opposite end thereof, said actuator being coupled with said element and disposed for moving the same to said second position when said actuator is moved toward said one end of the housing; and
   an electrically actuated light source within the housing, coupled with the remaining contact of said electrical switch and adapted to be operably coupled to said source of electrical power, said light source being actuated in response to the energization of said corresponding solenoid by bridging said terminals, whereby light from the source may be viewed through the open opposite end of the housing to indicate the corresponding operative condition of said track switch and that said corresponding solenoid was last to be energized.

3. In model railroad track apparatus as set forth in claim 2, wherein said mounting means releasably secures the base to said housing.

4. In model railroad track apparatus as set forth in claim 2, wherein said actuator includes a tube engaging said element, said light source being disposed within said tube.

5. In model railroad track apparatus as set forth in claim 4, wherein is provided means holding the tube against axial rotation relative to said housing, and wherein is provided a spring for biasing said element toward said first position thereof.

6. An electrical switching unit for use with an electrically actuated solenoid of a model railroad track switch comprising:
   a tubular housing having a pair of open ends;
   a base having a pair of spaced electrical terminals and an electrically conductive contact element movable from a first position out of bridging relationship to said terminals to a second position in bridging relationship thereto, said terminals adapted to be coupled to a source of electrical power and to the solenoid of a track switch for electrically actuating the solenoid when said element is in said second position;
   means mounting said base on said housing with said element at one end thereof;
   an actuator shiftably mounted within and extending longitudinally of said housing and terminating adjacent the opposite end thereof, said actuator being coupled with said element and disposed for moving the same to said second position when said actuator is moved toward said one end of the housing; and
   an electrically actuated light source within said housing and adapted to be coupled to a track switch and said source of electrical power, said light source being actuated in response to the movement of said element to said second position, whereby light from said source may be viewed through said open opposite end of the housing to indicate an operative condition of said track switch,
   said mounting means releasably securing said base to said housing,
   said housing including a pair of slots therein, one of said slots extending longitudinally of the housing from said one end and the other slot extending transversely of the housing from said one slot in spaced relationship to said one end, said mounting means including a projection secured to and extending laterally from the base, said base being movable into said one end of the housing to move said projection into said one slot until the projection is aligned with said other slot, said base being rotatable relative to said housing to move said projection into said other slot when said projection is aligned therewith to thereby releasably secure said base to said housing.

(References on following page)

References Cited

UNITED STATES PATENTS

| | | | |
|---|---|---|---|
| 1,710,884 | 4/1929 | Mackie. | |
| 2,273,353 | 2/1942 | Harris | 200—167 |
| 2,289,863 | 7/1942 | Batcheller | 200—168 X |
| 2,297,131 | 9/1942 | Bonanno | 246—220 |
| 2,863,028 | 12/1958 | Fraser et al. | 200—167 |
| 3,118,038 | 1/1964 | McKnight | 200—167 |
| 3,183,333 | 5/1965 | Godlbeck | 200—167 X |

OTHER REFERENCES

Model Railroader, May 1963, pp. 58, 60, 61.

ARTHUR L. LA POINT, *Primary Examiner.*

S. B. GREEN, S. T. KRAWCZEWICZ,
*Assistant Examiners.*